United States Patent
Keller et al.

(10) Patent No.: US 9,705,117 B2
(45) Date of Patent: Jul. 11, 2017

(54) BATTERY HOUSING PART

(71) Applicant: Dr. Ing. h.c. F. Porsche Aktiengesellschaft, Stuttgart (DE)

(72) Inventors: Ralf Keller, Niefern-Oeschelbronn (DE); Eduard Ewert, Karlsruhe (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 64 days.

(21) Appl. No.: 14/877,301

(22) Filed: Oct. 7, 2015

(65) Prior Publication Data

US 2016/0118635 A1 Apr. 28, 2016

(30) Foreign Application Priority Data

Oct. 27, 2014 (DE) .......................... 10 2014 115 561

(51) Int. Cl.
*H01M 2/10* (2006.01)

(52) U.S. Cl.
CPC ...... *H01M 2/1077* (2013.01); *H01M 2220/20* (2013.01)

(58) Field of Classification Search
CPC .......... H01M 2220/20; H01M 2/1077; H01M 2/1083
See application file for complete search history.

(56) References Cited

U.S. PATENT DOCUMENTS

| | | |
|---|---|---|
| 4,309,818 A | 1/1982 | Kline |
| 7,914,924 B2 | 3/2011 | Sugeno |
| 2005/0202315 A1 | 9/2005 | Sugeno |
| 2012/0077061 A1 | 3/2012 | Ohms et al. |
| 2012/0328925 A1* | 12/2012 | Choo ................. H01M 2/1077 429/99 |
| 2015/0162639 A1* | 6/2015 | Lee .................... H01M 10/0413 429/149 |
| 2015/0255765 A1* | 9/2015 | Pflueger ............. H01M 2/1077 429/99 |
| 2016/0043365 A1* | 2/2016 | Vogel ................. H01M 2/1077 429/99 |

FOREIGN PATENT DOCUMENTS

| | | |
|---|---|---|
| DE | 31 17 917 | 3/1982 |
| DE | 10 2006 044 174 | 3/2008 |

(Continued)

OTHER PUBLICATIONS

German Search Report of Jul. 2, 2015.
Korean Office Action Dated Aug. 29, 2016.

*Primary Examiner* — Stewart Fraser
(74) *Attorney, Agent, or Firm* — Gerald E. Hespos; Michael J. Porco; Matthew T. Hespos

(57) ABSTRACT

A battery housing part (10) for a traction battery has opposite first and second vertically aligned housing walls (12, 14) for laterally covering battery cells, a second housing wall (14) from a floor level (28) to a cover level (30) and horizontally from a left side level (32) to a right side level (34). At least one reinforcement profile (18) is connected to the first housing wall (12) and the second housing wall (14) for at least partial dissipation of impact forces in the case of a crash of the motor vehicle. The reinforcement profile (18) is spaced apart both from the floor level (28) and the cover level (30) and from the left side level (32) and the right side level (34).

17 Claims, 2 Drawing Sheets

(56) References Cited

FOREIGN PATENT DOCUMENTS

| | | |
|---|---|---|
| EP | 2 434 565 | 3/2012 |
| EP | 2 749 444 | 7/2014 |
| JP | 2012-138337 | 7/2012 |
| KR | 1020050075284 B1 | 7/2005 |
| KR | 100776767 B1 | 11/2007 |

* cited by examiner

BATTERY HOUSING PART

CROSS REFERENCE TO RELATED APPLICATION

This application claims priority under 35 USC 119 to German Patent Appl. No. 10 2014 115 561.0 filed on Oct. 27, 2014, the entire disclosure of which is incorporated herein by reference.

BACKGROUND

1. Field of the Invention

The invention relates to a battery housing part, with the aid of which battery cells of a motor vehicle battery, such as a traction battery for the purely electric drive of a motor vehicle can be protected against mechanical influences.

2. Description of the Related Art

EP 2 749 444 A1 discloses a battery housing for a traction battery of a motor vehicle. The battery housing has upper and lower shells that are manufactured from aluminum and that are screwed together. The floor of the lower shell and the cover of the upper shell are structured three-dimensionally. Furthermore, horizontally outwardly projecting cooling fins are provided.

There is a constant need to provide optimum protection for battery cells of a traction battery against mechanical influences.

It is an object of the invention to provide improved protection of battery cells of a traction battery of a motor vehicle, against high mechanical influences.

SUMMARY

The invention relates to a battery housing part or frame for a traction battery for the purely electric drive of a motor vehicle. The battery housing frame has a first housing wall for lateral covering of battery cells and a second housing wall arranged opposite the first housing wall for lateral covering of battery cells. The first and second housing walls extend vertically from a floor level as far as a cover level and horizontally from a left side level to a right side level. At least one reinforcement profile is connected to the first and second housing walls for the at least partial dissipation of impact forces in the case of a crash of the motor vehicle. The reinforcement profile is spaced apart both from the floor level and the cover level and from the left and right side levels.

A battery housing having the above-described battery housing part can be stiffened considerably by the at least one reinforcement profile. As a result, elongate side walls of the battery housing are protected against buckling under mechanical loads, and damage to a battery cell in the interior of the battery housing and between the first and second housing walls is avoided by preventing buckling of the first and second side walls. In particular, impact forces can act on the battery housing part in the case of an accident of the motor vehicle. However, such impact forces can be supported and dissipated by the reinforcement profile. As a result, elastic and/or plastic deformation of the first and second housing walls can be avoided despite such impact forces. Accordingly, the battery cells are protected against damage even in a crash of the motor vehicle. The reinforcement profile may run centrally through the interior of the battery housing part. Thus, the impact forces can be supported in the case of a crash without significant plastic deformation of the first and second housing walls and without damage to the battery cells arranged between the first and second housing walls. Therefore, the battery cells are protected against high mechanical influences.

The battery cells usually can be arranged next to one another, behind one another and above one another. As a result, the reinforcement profile can run through between the battery cells from the first housing wall as far as the second housing wall. It is not necessary to provide an intermediate floor or an intermediate wall. Instead, the reinforcement profile can have a comparatively small cross-sectional area and can be manufactured with a correspondingly low use of material. The reinforcement profile may be configured to dissipate longitudinal forces and can have a cross-sectional profile that leads to a comparatively high buckling force. In particular, the reinforcement profile can be spaced considerably from edge regions close to the cover level, the floor level or the side levels. Therefore, the reinforcement profile can act in a region of the housing walls that is particularly at risk of buckling. In particular, the battery housing part is not configured as a housing cover or housing floor, but rather as a housing frame that is open at the top and bottom. Thus, the reinforcement profile can be manufactured easily by metal casting without additional assembly outlay. In particular, first and second reinforcement profiles may run at substantially right angles to one another and can run in a common plane or in planes that are offset with respect to one another. To this end, for example, two correspondingly shaped housing parts can be inserted into one another to define a housing frame with intersecting reinforcement profiles.

If the first and second housing walls are open at the top and/or bottom, the bottom level may be defined by a lower end to which a housing floor can be connected, and the cover level may be defined by an upper end to which a housing cover can be connected. If the first and second housing walls are closed at the bottom, the bottom level may be defined by the inner side of the housing floor that points into the interior of the battery housing part in the transition region to the first and second housing walls. If the first and second housing walls are closed at the top, the cover level may be defined by the inner side of the housing cover that points into the interior of the battery housing part in the transition region to the first and second housing walls. If the first and second housing walls are connected to one another via side walls, the left side level and the right side level may be defined by an inner side of the respective side wall that points into the interior of the battery housing part. If the first and second housing walls are not connected to one another via side walls, the left and right side levels may be defined by the side faces of the first and second housing walls, and one side wall can be connected to each side face.

The reinforcement profile may be configured in one piece with the first and/or second housing walls. This can result in a particularly satisfactory assembly of the reinforcement profile with the first and/or second housing walls, as a result of which bending moments and torsional moments also can be supported. As a result, the battery housing part and a battery housing that has battery housing part can be reinforced to a particularly pronounced extent.

The first housing wall, the second housing wall and the reinforcement profile may be manufactured by high-pressure die casting, in particular aluminum high-pressure continuous casting. As a result, the battery housing part can be manufactured easily and inexpensively in mass production. The reinforcement profile may be made by an appropriately designed die so that there is no assembly outlay for the reinforcement profile. For example, the die can be split in the plane of the reinforcement profile so that a cavity for the reinforcement profile can be provided on those surfaces of the respective die part of the die that point toward one another.

The first and second housing walls may and have a lower end for fastening to a housing floor and an upper end for fastening to a housing cover. As a result, the battery housing part may be configured to be open at the top and/or at the bottom, and can be configured as a housing frame. The at least one opening enables the reinforcement profile and the first and second housing walls to be configured in one piece in a casting process. A core of the die and/or a projection of a die part of the die can protrude via the opening that is formed into the interior of the battery housing part and can be moved out of the solidified battery housing part by a linear movement.

The reinforcement profile may be substantially rod-shaped with a substantially T-shaped cross-sectional area. The reinforcement profile can have a considerably greater extent in the longitudinal direction than in the transverse direction. As a result, the reinforcement profile can be of sufficiently thin configuration to run between adjacent battery cells in the interior of the battery housing part. The T-shaped cross-section enables the reinforcement profile to transmit high forces with a low use of material. Furthermore, the reinforcement profile can be configured to be sufficiently flexurally rigid and/or torsionally rigid. In particular, if the battery cells are substantially rectangular, for example as pouch cells, the reinforcement profile can readily be in a corner region of three or four battery cells.

At least one bulkhead plate may separate two battery cells that are arranged laterally next to one another and may be fastened to the first and second housing walls. The bulkhead plate may be configured for at least partial dissipation of impact forces in the case of a crash of the motor vehicle, and may be spaced apart from the left and right side levels. The bulkhead plate can delimit, for example, a flow path of a cooling medium. The bulkhead plate may be manufactured by metal casting, for example aluminum high pressure continuous casting. The battery housing part also can be stiffened by the bulkhead plate. In particular, the bulkhead plate has a greater surface area in comparison with the reinforcement profile. Furthermore, the reinforcement profile can have a higher buckling force in comparison with the bulkhead plate.

The bulkhead plate may bears against the reinforcement profile. The relative position of the bulkhead plate within the battery housing part can be defined by the reinforcement profile. Thus, the mounting of the bulkhead plate is simplified.

The bulkhead plate may be connected releasably to the first and second housing walls, with the bulkhead plate being pushed in a first guide of the first side wall and in a second guide of the second side wall. As a result, the bulkhead wall easily can be provided or omitted depending on the application. Thus, the positioning of the battery cells can be simplified, and the assembly is improved. For example, the bulkhead plate can be pushed into the battery housing part along the guide and can be received in a captive manner after the mounting of a housing floor and/or a housing cover without a separate screw connection being required.

The bulkhead plate may be spaced from the floor level and the cover level. As a result, the bulkhead plate can be installed with considerable play so that tolerance requirements and manufacturing costs can be kept low.

The invention also relates to a traction battery for the purely electric drive of a motor vehicle. The traction battery has a battery housing with the above-described battery housing part and at least one battery cell arranged in the battery housing. The reinforcement profile runs past and is spaced from the at least one battery cell. In particular, the battery housing part may be connected to a housing cover and a housing floor to delimit an interior of the battery housing in which the battery cell is arranged. The reinforcement profile that runs centrally through the interior of the battery housing and between the first and second housing walls provides support against impact forces that occur in the case of a crash of the motor vehicle without significant plastic deformation of the first and second housing walls. As a result, the battery cells of the traction battery are protected from high mechanical influences.

In the following text, the invention will be explained by way of example with reference to the appended drawings using preferred exemplary embodiments, it being possible for the features which are described in the following text to represent an aspect of the invention both in each case individually and in combination.

DETAILED DESCRIPTION

Figure 1:
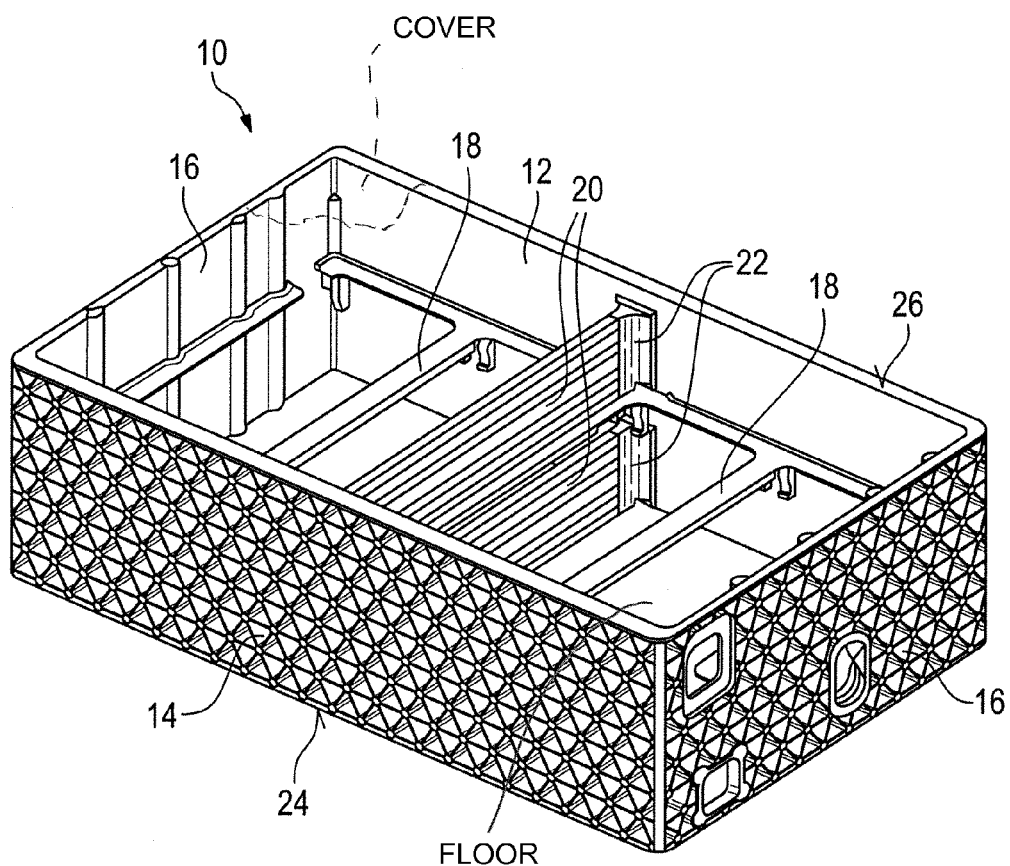
FIG. 1 is a diagrammatic perspective view of a battery housing part.

The battery housing part 10 of FIG. 1 has a long first housing wall 12 and a long second housing wall 14 that are connected to one another via a short side wall 16 to form a substantially rectangular housing frame for a battery housing of a traction battery. Approximately half way up, the first and second housing walls 12 and 14 are connected to one another via reinforcement profiles 18 that are configured as T-profiles for greatly reinforcing the battery housing part 10.

Figure 2:
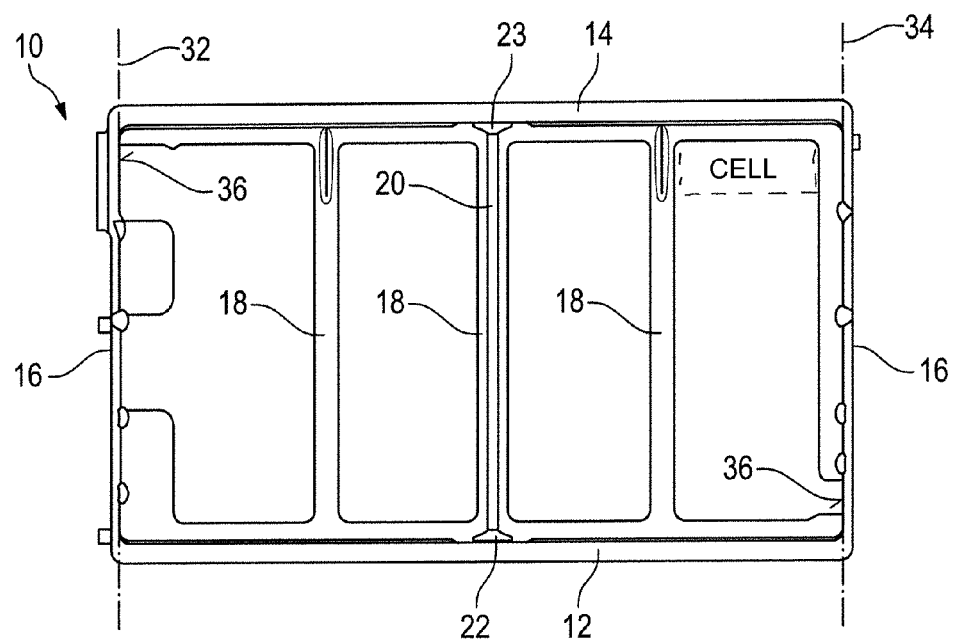
FIG. 2 is a diagrammatic plan view of the battery housing part from FIG. 1.
Figure 3:
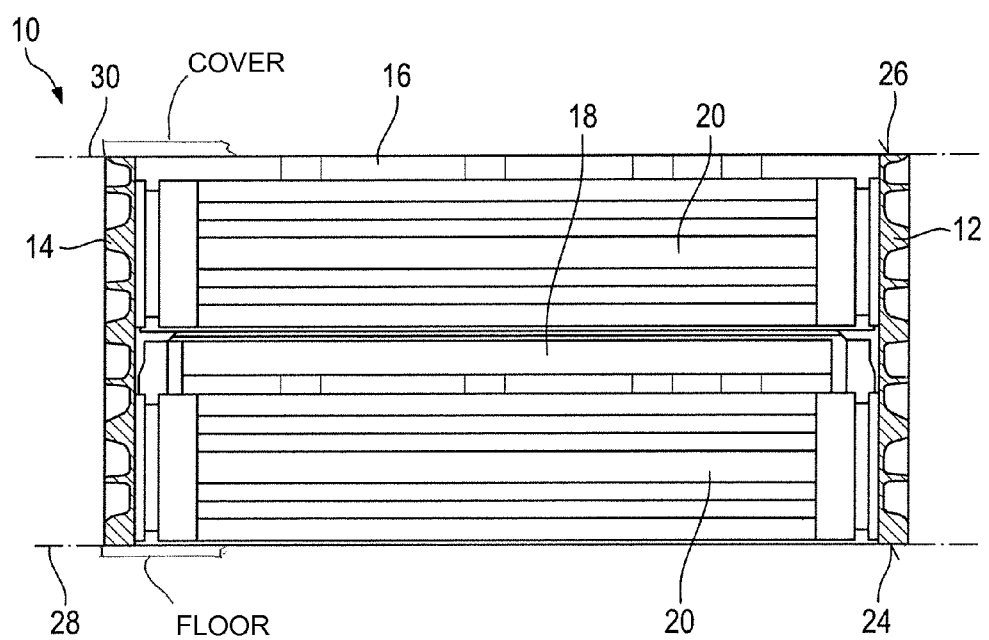
FIG. 3 is a diagrammatic sectional view from the side of the battery housing part from FIG. 1.

Bulkhead plates 20 can be inserted releasably from below or above into a vertical first guide 22 of the first housing wall 12 and a vertical second guide 23 of the second housing wall 14 to provide additional reinforcement for the battery housing part 10. The bulkhead plates 20 can be arranged substantially vertically below or above one of the reinforcement profiles 18, as shown in FIGS. 2 and 3.

The battery housing part 10 is configured as a housing frame that is open at the top and at the bottom. As a result, the battery housing part 10 can readily be manufactured by aluminum high pressure continuous casting. The first housing wall 12, the second housing wall 14 and the side walls 16 have lower ends 24 to which a housing floor can be connected and an upper end 26 to which a housing cover can be connected. In the illustrated embodiment, a floor level 28 of the battery housing part 10 is defined by the lower end 24, whereas a cover level 30 of the battery housing part 10 is defined by the upper end 26. In addition, a left side level 32 of the battery housing part 10 and a right side level 34 of the battery housing part 10 are defined by a respective inner side 36 of the associated side wall 16.

What is claimed is:

1. A battery housing part for a traction battery for a purely electric drive of a motor vehicle, comprising:
opposite first and second housing walls for laterally covering battery cells, the first and second housing walls extending vertically from a floor level to a cover level and horizontally from a left side level to a right side level; and at least one reinforcement profile connected to the first and second housing walls for at least partial dissipation of impact forces in a crash of the motor vehicle, the reinforcement profile being spaced apart both from the floor level and the cover level and from the left side level and the right side level wherein the first housing wall, the second housing wall and the reinforcement profile are manufactured by aluminum high pressure continuous casting.

2. The battery housing part of claim 1, wherein the reinforcement profile is configured in one piece with the first housing wall and/or with the second housing wall.

3. The battery housing part of claim 1, wherein the first and second housing walls each have a lower end for fastening to a housing floor and an upper end for fastening to a housing cover.

4. A traction battery for a purely electric drive of a motor vehicle, comprising a battery housing with the battery housing part of claim 1, and at least one battery cell arranged in the battery housing, the reinforcement profile running past the at least one battery cell.

5. A battery housing part for a traction battery for a purely electric drive of a motor vehicle, comprising:

opposite first and second housing walls for laterally covering battery cells, the first and second housing walls extending vertically from a floor level to a cover level and horizontally from a left side level to a right side level; and at least one reinforcement profile connected to the first and second housing walls for at least partial dissipation of impact forces in a crash of the motor vehicle, the reinforcement profile being spaced apart both from the floor level and the cover level and from the left side level and the right side level, wherein the reinforcement profile is of substantially rod-shaped configuration with a substantially T-shaped cross-sectional area.

6. The battery housing part of claim 5, wherein the reinforcement profile is configured in one piece with the first housing wall and/or with the second housing wall.

7. The battery housing part of claim 5, wherein the first housing wall, the second housing wall and the reinforcement profile are manufactured by aluminum high pressure continuous casting.

8. The battery housing part of claim 5, wherein the first and second housing walls each have a lower end for fastening to a housing floor and an upper end for fastening to a housing cover.

9. A traction battery for a purely electric drive of a motor vehicle, comprising a battery housing with the battery housing part of claim 5, and at least one battery cell arranged in the battery housing, the reinforcement profile running past the at least one battery cell.

10. A battery housing part for a traction battery for a purely electric drive of a motor vehicle, comprising:

opposite first and second housing walls for laterally covering battery cells, the first and second housing walls extending vertically from a floor level to a cover level and horizontally from a left side level to a right side level;

at least one reinforcement profile connected to the first and second housing walls for at least partial dissipation of impact forces in a crash of the motor vehicle, the reinforcement profile being spaced apart both from the floor level and the cover level and from the left side level and the right side level; and at least one bulkhead plate fastened to the first and second housing walls for separating two battery cells that are arranged laterally next to one another, the bulkhead plate being configured for at least partial dissipation of impact forces in a crash of the motor vehicle and being spaced apart from the left side level and the right side level.

11. The battery housing part of claim 10, the bulkhead plate bears against the reinforcement profile.

12. The battery housing part of claim 11, wherein the bulkhead plate is connected releasably to the first and second housing walls and is inserted linearly into first and second guides disposed respectively on the first and second side walls.

13. The battery housing part of claim 12, wherein the bulkhead plate is spaced apart from the floor level and the cover level.

14. A traction battery for a purely electric drive of a motor vehicle, comprising a battery housing with the battery housing part of claim 6, and at least one battery cell arranged in the battery housing, the reinforcement profile running past the at least one battery cell.

15. The battery housing part of claim 10, wherein the reinforcement profile is configured in one piece with the first housing wall and/or with the second housing wall.

16. The battery housing part of claim 10, wherein the first housing wall, the second housing wall and the reinforcement profile are manufactured by aluminum high pressure continuous casting.

17. The battery housing part of claim 10, wherein the first and second housing walls each have a lower end for fastening to a housing floor and an upper end for fastening to a housing cover.

* * * * *